United States Patent
Minefuji

(10) Patent No.: US 6,781,768 B2
(45) Date of Patent: Aug. 24, 2004

(54) ZOOM LEN SYSTEM

(75) Inventor: Nobutaka Minefuji, Saitama (JP)

(73) Assignee: PENTAX Corporation, Tokyo (JP)

(*) Notice: Subject to any disclaimer, the term of this patent is extended or adjusted under 35 U.S.C. 154(b) by 21 days.

(21) Appl. No.: 10/282,165

(22) Filed: Oct. 29, 2002

(65) Prior Publication Data

US 2003/0123156 A1 Jul. 3, 2003

(30) Foreign Application Priority Data

Oct. 31, 2001 (JP) ........................................ 2001-335437

(51) Int. Cl.$^7$ ............................................. G02B 15/14
(52) U.S. Cl. ...................................... 359/689; 359/682
(58) Field of Search ................................ 359/680–683, 359/689, 687, 676

(56) References Cited

U.S. PATENT DOCUMENTS

| | | | |
|---|---|---|---|
| 5,867,326 A | * 2/1999 | Yamamoto | 359/686 |
| 6,246,529 B1 | 6/2001 | Sensui | 359/680 |
| 6,308,011 B1 | 10/2001 | Wachi et al. | 396/72 |

FOREIGN PATENT DOCUMENTS

| | | |
|---|---|---|
| JP | 6-94996 | 4/1994 |
| JP | 1039214 | 2/1998 |
| JP | 11194274 | 7/1999 |

* cited by examiner

Primary Examiner—Georgia Epps
Assistant Examiner—William Choi
(74) Attorney, Agent, or Firm—Greenblum & Bernstein, P.L.C.

(57) ABSTRACT

A zoom lens system includes a negative first lens group, a positive second lens group, and a positive third lens group, in this order from the object. Upon zooming from the short focal length extremity to the long focal length extremity, the positive third lens group remains stationary, and the negative first and positive second lens groups move along the optical axis of the zoom lens system. The negative first lens group includes at least one positive lens element which has a convex aspherical surface facing toward the image. Furthermore, the following conditions (1) and (2) are satisfied:

$$1.2<|f1/f2|<1.6 \qquad (1)$$

$$0.8<f3/f2<1.3 \qquad (2)$$

wherein
  f1, f2 and f3 designate the focal length of the first, second and third lens groups, respectively.

4 Claims, 11 Drawing Sheets

Fig. 1
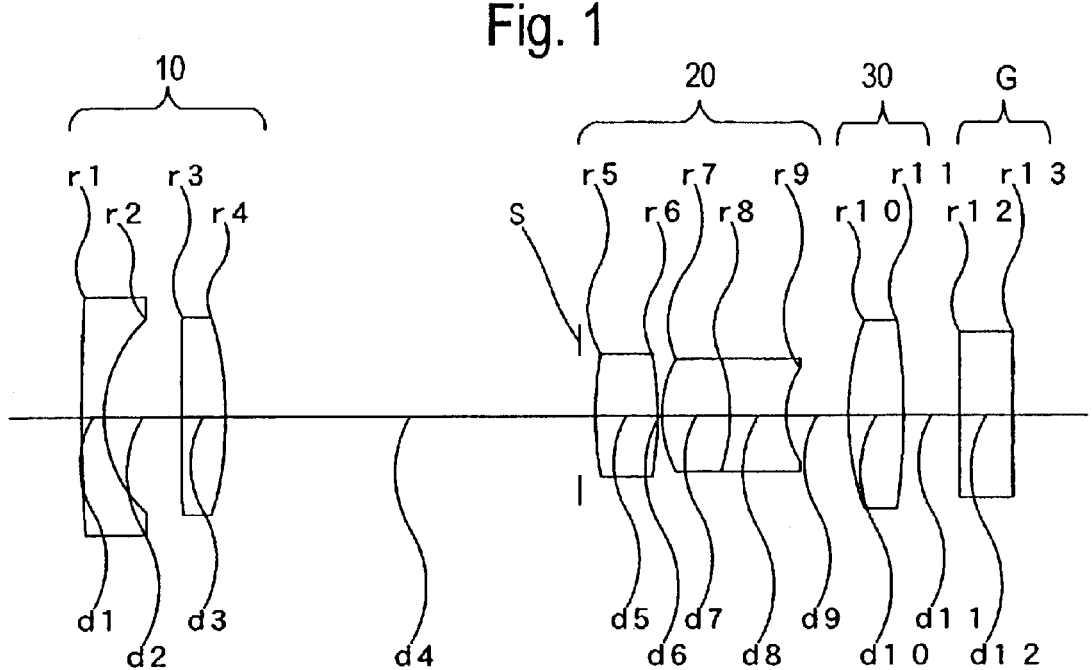
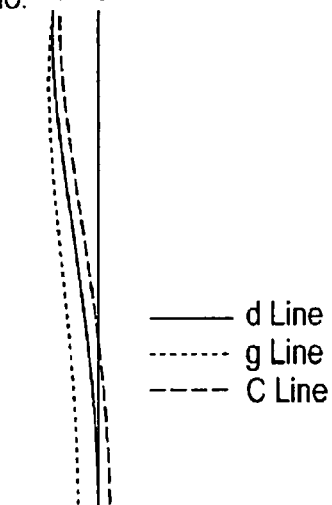
Fig. 2A
$F_{NO.}= 1: 2.6$
-0.1    0.1
SPHERICAL
ABERRATION
CHROMATIC
ABERRATION
— d Line
······ g Line
--- C Line
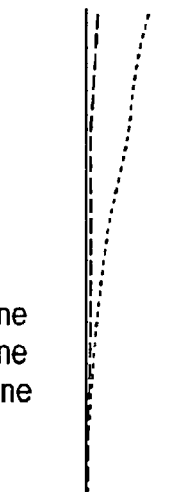
Fig. 2B
W=32.5
-0.01    0.01
LATERAL
CHROMATIC
ABERRATION
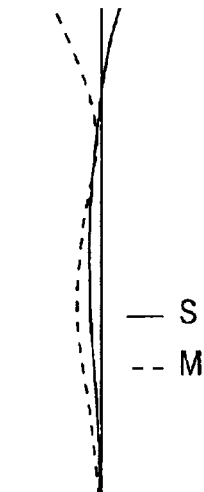
Fig. 2C
W=32.5
-0.1    0.1
ASTIGMATISM
— S
-- M
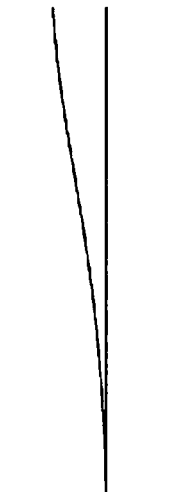
Fig. 2D
W=32.5
-5.0 (%) 5.0
DISTORTION

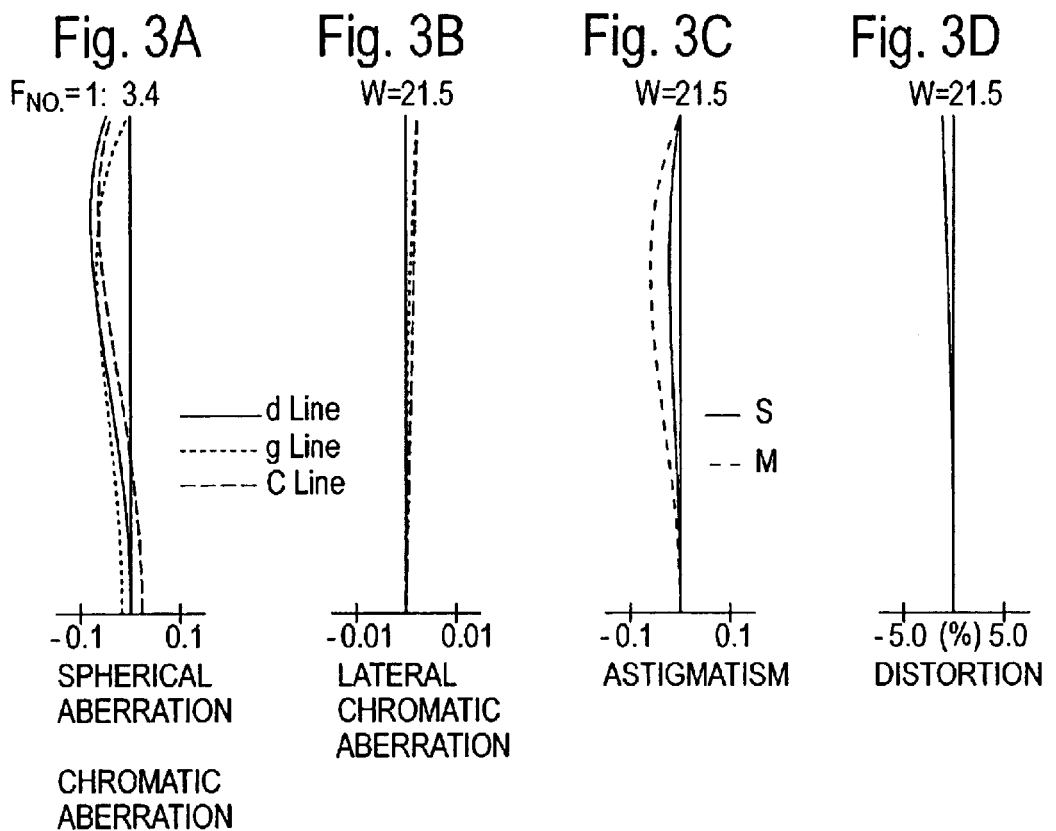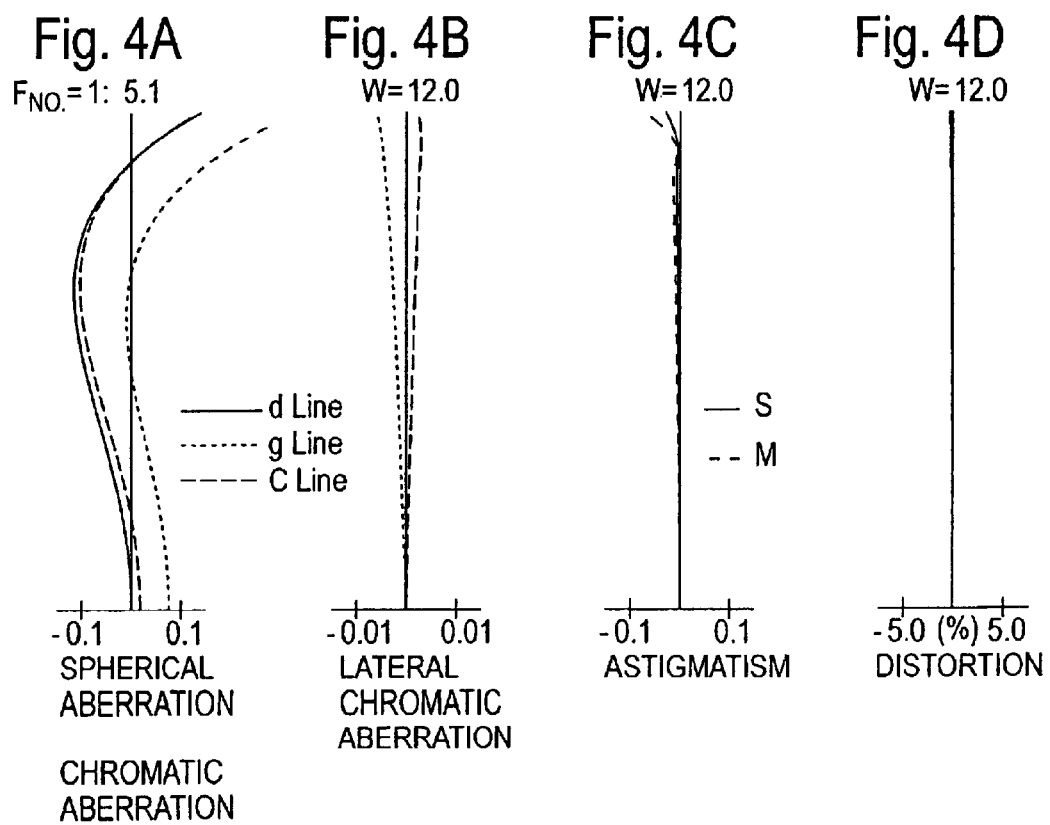

Fig. 5
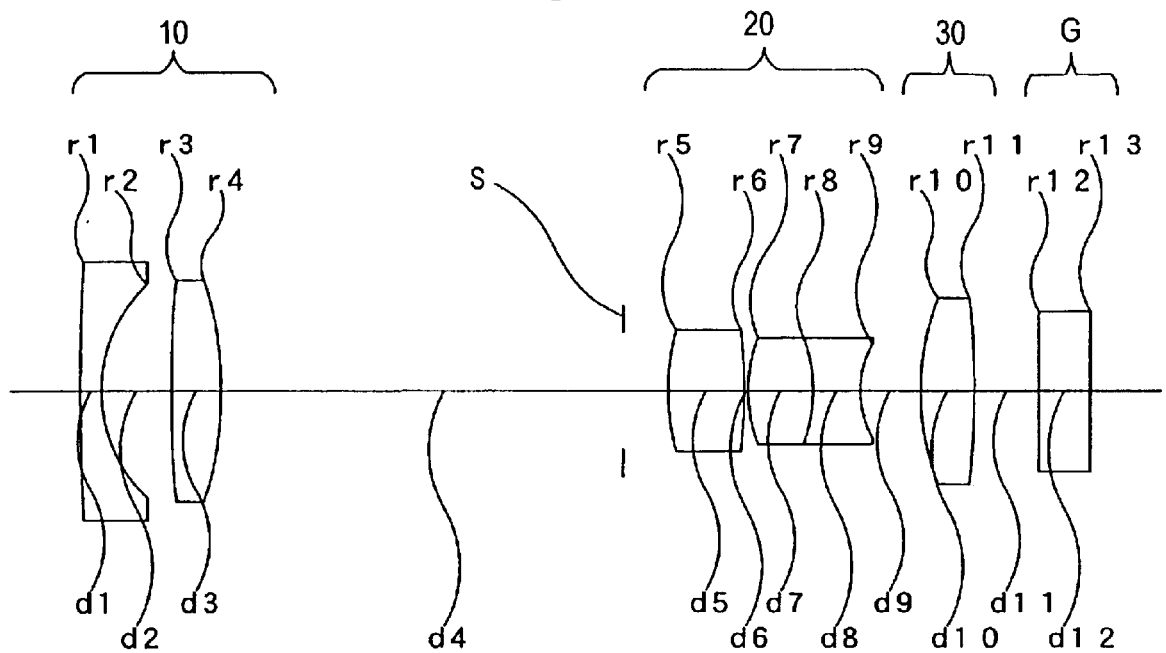
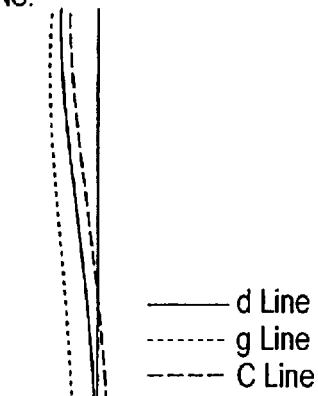
Fig. 6A
F_NO.=1: 2.7
—— d Line
······· g Line
- - - C Line
-0.1  0.1
SPHERICAL
ABERRATION
CHROMATIC
ABERRATION
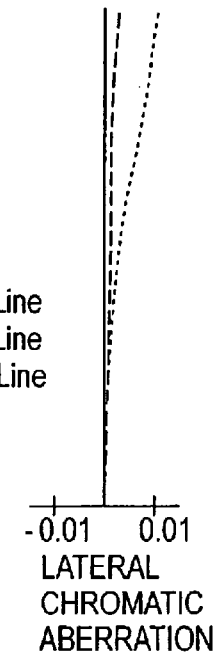
Fig. 6B
W=32.6
-0.01  0.01
LATERAL
CHROMATIC
ABERRATION
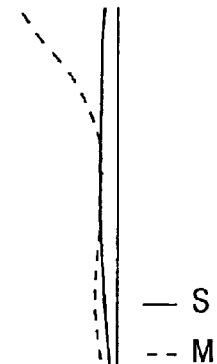
Fig. 6C
W=32.6
—— S
- - M
-0.1  0.1
ASTIGMATISM
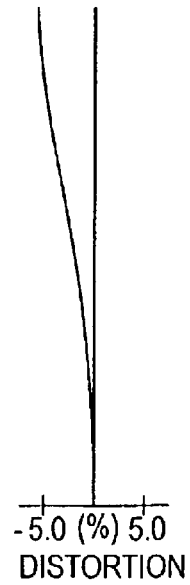
Fig. 6D
W=32.6
-5.0 (%) 5.0
DISTORTION

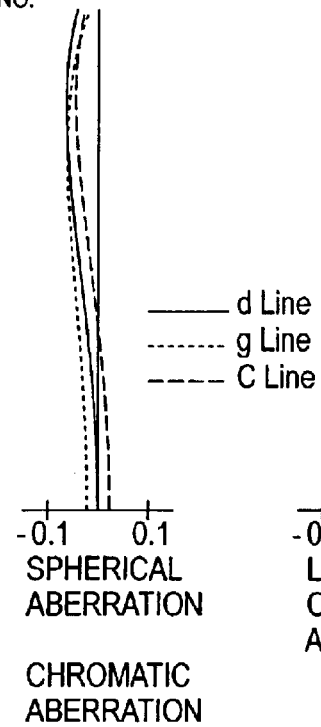
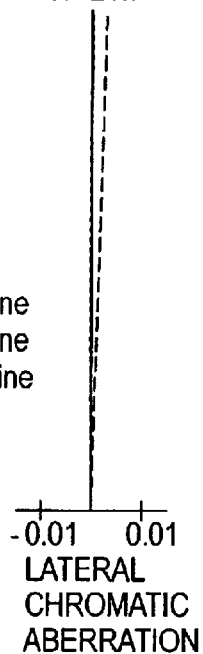
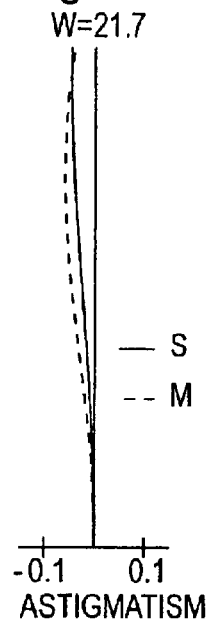
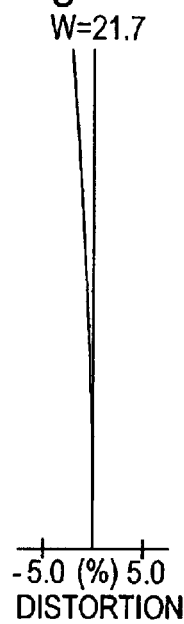
Fig. 7A  F_NO.=1: 3.4  SPHERICAL ABERRATION CHROMATIC ABERRATION
Fig. 7B  W=21.7  LATERAL CHROMATIC ABERRATION
Fig. 7C  W=21.7  ASTIGMATISM
Fig. 7D  W=21.7  DISTORTION
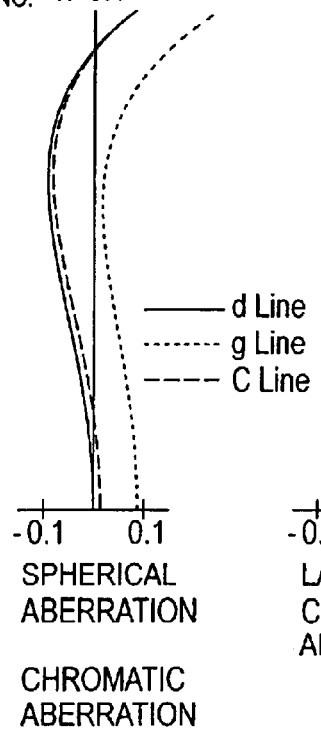
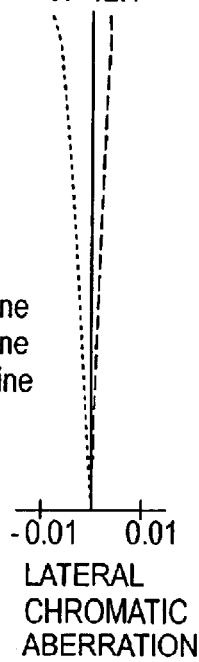
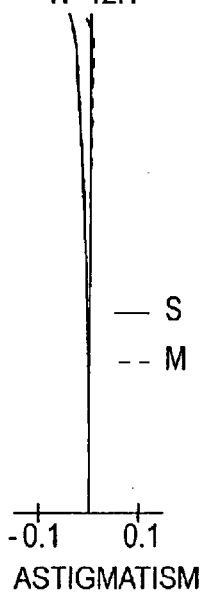
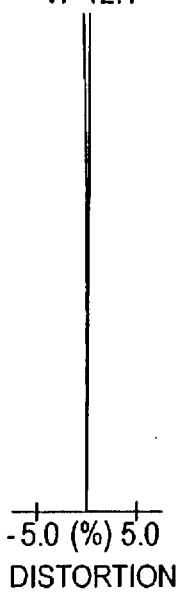
Fig. 8A  F_NO.=1: 5.1  SPHERICAL ABERRATION CHROMATIC ABERRATION
Fig. 8B  W=12.1  LATERAL CHROMATIC ABERRATION
Fig. 8C  W=12.1  ASTIGMATISM
Fig. 8D  W=12.1  DISTORTION Fig. 9
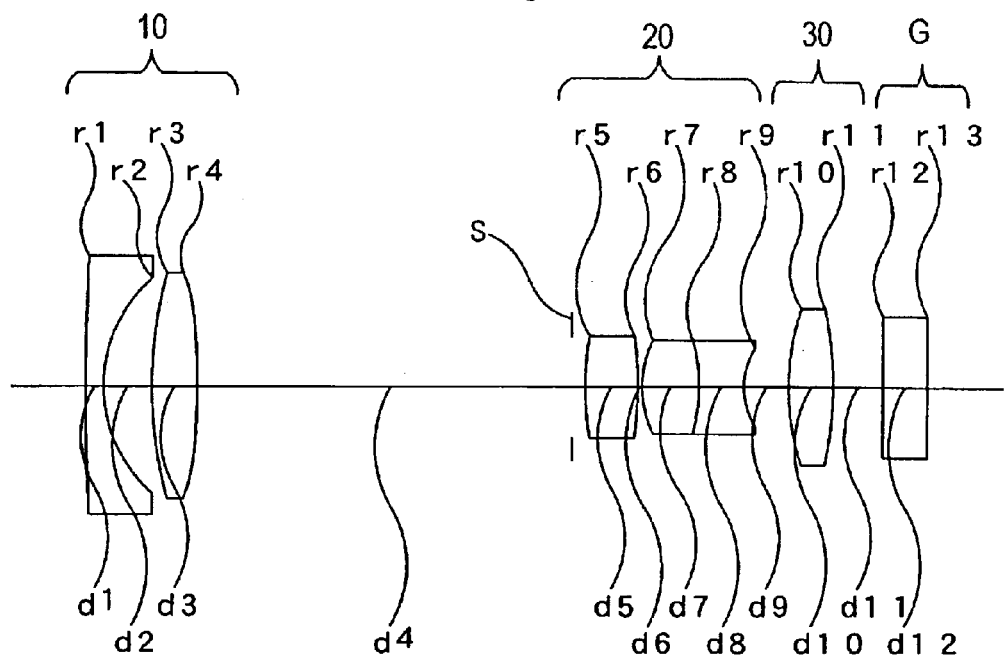
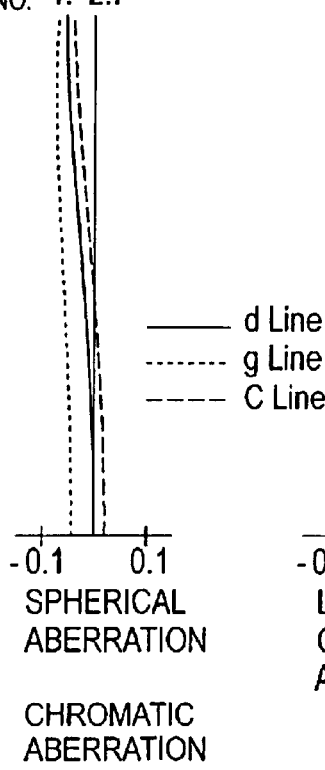
Fig. 10A
$F_{NO.}=1: 2.7$
—— d Line
········ g Line
- - - C Line
-0.1   0.1
SPHERICAL
ABERRATION
CHROMATIC
ABERRATION
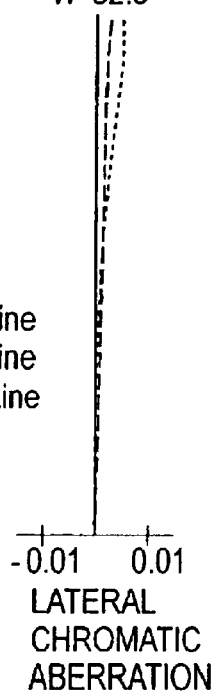
Fig. 10B
W=32.3
-0.01   0.01
LATERAL
CHROMATIC
ABERRATION
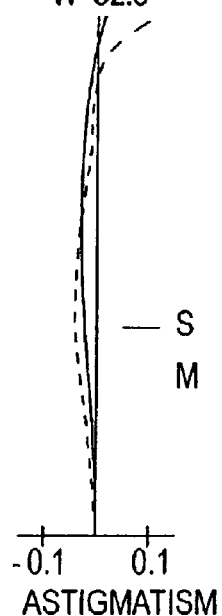
Fig. 10C
W=32.3
—— S
- - - M
-0.1   0.1
ASTIGMATISM
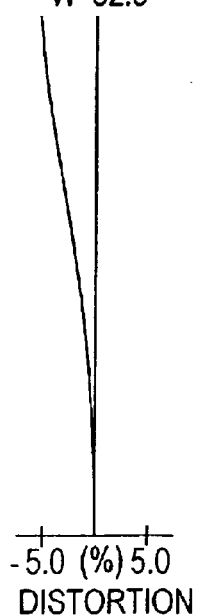
Fig. 10D
W=32.3
-5.0 (%) 5.0
DISTORTION $F_{NO.}=1:3.6$ — d Line
······ g Line
---- C Line

-0.1  0.1
SPHERICAL
ABERRATION

CHROMATIC
ABERRATION

W=19.5

-0.01  0.01
LATERAL
CHROMATIC
ABERRATION

W=19.5

— S
-- M

-0.1  0.1
ASTIGMATISM

W=19.5

-5.0 (%) 5.0
DISTORTION $F_{NO.}=1:5.0$

— d Line
······ g Line
---- C Line

-0.1  0.1
SPHERICAL
ABERRATION

CHROMATIC
ABERRATION

W=11.9

-0.01  0.01
LATERAL
CHROMATIC
ABERRATION

W=11.9

— S
-- M

-0.1  0.1
ASTIGMATISM

W=11.9

-5.0 (%) 5.0
DISTORTION

Fig. 13
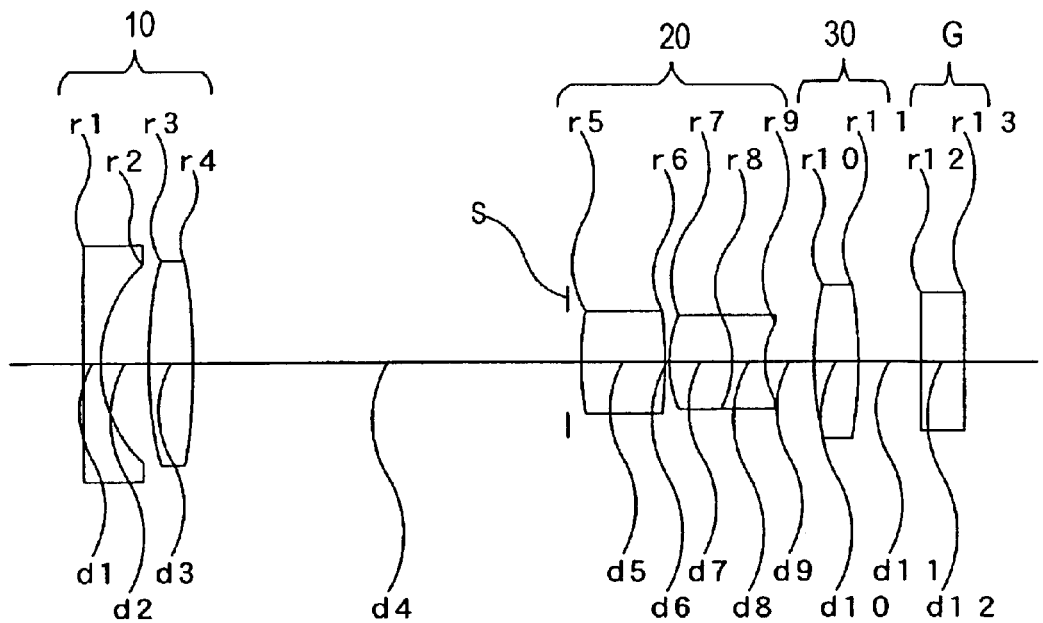
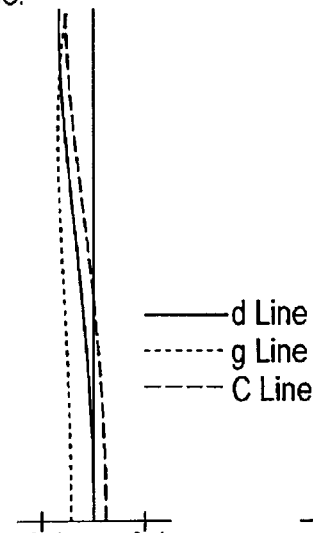
Fig. 14A
$F_{NO.}=1: 2.7$
-0.1  0.1
SPHERICAL
ABERRATION
CHROMATIC
ABERRATION
— d Line
------ g Line
--- C Line
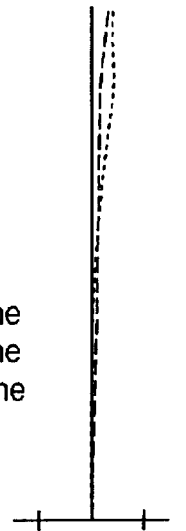
Fig. 14B
W=32.4
-0.01  0.01
LATERAL
CHROMATIC
ABERRATION
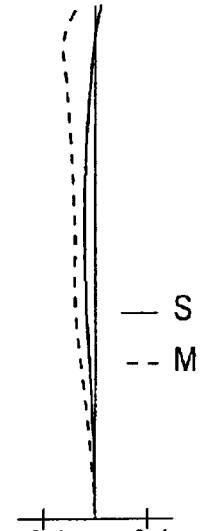
Fig. 14C
W=32.4
-0.1  0.1
ASTIGMATISM
— S
-- M
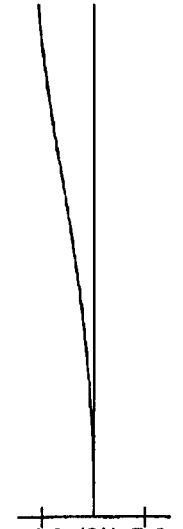
Fig. 14D
W=32.4
-5.0 (%) 5.0
DISTORTION

F_NO.=1: 3.6

-0.1  0.1
SPHERICAL
ABERRATION

CHROMATIC
ABERRATION

—— d Line
······· g Line
— — — C Line

W=19.6

-0.01  0.01
LATERAL
CHROMATIC
ABERRATION

W=19.6

—— S
— — M

-0.1  0.1
ASTIGMATISM

W=19.6

-5.0 (%) 5.0
DISTORTION

F_NO.= 1: 5.1

—— d Line
······· g Line
— — — C Line

-0.1  0.1
SPHERICAL
ABERRATION

CHROMATIC
ABERRATION

W=11.9

-0.01  0.01
LATERAL
CHROMATIC
ABERRATION

W=11.9

—— S
— — M

-0.1  0.1
ASTIGMATISM

W=11.9

-5.0 (%) 5.0
DISTORTION $F_{NO.}=1: 2.7$

—— d Line
········ g Line
– – – C Line

SPHERICAL
ABERRATION

CHROMATIC
ABERRATION

W=32.4

LATERAL
CHROMATIC
ABERRATION

W=32.4

—— S
– – M

ASTIGMATISM

W=32.4

DISTORTION $F_{NO.}= 1: 3.6$

— d Line
······ g Line
- - - C Line

-0.1  0.1
SPHERICAL
ABERRATION

CHROMATIC
ABERRATION

W=19.7

-0.01  0.01
LATERAL
CHROMATIC
ABERRATION

W=19.7

— S
- - M

-0.1  0.1
ASTIGMATISM

W=19.7

-5.0 (%) 5.0
DISTORTION $F_{NO.}=1: 5.1$

— d Line
······ g Line
- - - C Line

-0.1  0.1
SPHERICAL
ABERRATION

CHROMATIC
ABERRATION

W=11.9

-0.01  0.01
LATERAL
CHROMATIC
ABERRATION

W=11.9

— S
- - M

-0.1  0.1
ASTIGMATISM

W=11.9

-5.0 (%) 5.0
DISTORTION

ZOOM LEN SYSTEM

BACKGROUND OF THE INVENTION

1. Field of the Invention

The present invention relates to a zoom lens system to be used in a small and light-weight video camera or digital camera and the like. The zoom lens system has an aperture ratio of more than 1:2.8, a magnification ratio (zoom ratio) of approximately 3.0, and a simple structure which can be produced at low costs.

2. Description of the Prior Art

In recent years, along with further miniaturization and higher density of a small imaging device, such as a CCD, a zoom lens system which is utilized in video cameras, electronic still cameras and the like have also been required to be further miniaturized and to have higher performance. Furthermore, in a solid-state imaging device utilized in such video cameras and electronic still cameras, a color separation filter is provided in the close vicinity of a light-receiving surface of the solid-state imaging device. Due to this structure, the a bundle of light ryas which is obliquely incident on the light-receiving surface via the zoom lens system is interrupted by the color separation filter, which causes a decrease of peripheral illumination. Moreover, color irregularities occur due to misalignment of the color separation filter with respect to the pixels of the solid-state imaging device. Accordingly, in order to eliminate such drawbacks, an optical system in which the exit pupil is distant from the image plane is required. Due to this optical arrangement, a bundle of light rays can be incident on the light-receiving surface at an angle close to 90°. In other words, such an optical arrangement can achieve suitable telecentricity.

Furthermore, in recent compact zoom cameras, miniaturization thereof in a photographing state has been considered to be important; in addition, the compactness of the camera when the lens system is retracted and is being carried by a user is considered to be also important for further miniaturization. In other words, in such a zoom lens system, even when the lens system is retracted into the camera body, maintaining a slim camera body is required.

In order to achieve a slim camera body, thickness of each lens group which constitutes the zoom lens system has to be reduced; and in order to reduce the mechanical burden, it is necessary to reduce the traveling distance of each lens group upon zooming.

In a miniaturized zoom lens system of the prior art, a two-lens-group zoom lens system constituted by a negative first lens group and a positive second lens group is known. However, the exit pupil is relatively close to the image plane in many of such two-lens-group zoom lens systems, which is undesirable for a solid-state imaging device such as a CCD. Furthermore, when photographing an object at a closer distance, focusing needs to be carried out with the large-diameter first lens group, so that the focusing drive system undesirably becomes larger.

In order to overcome the above drawbacks, a three-lens-group zoom lens system which improves telecentricity has been proposed in Japanese Unexamined Patent Publication Nos. Hei-6-94996, Hei-10-39214, and Hei-11-194274. The three-lens-group zoom lens systems disclosed in these publications are constituted by a first lens group, a second lens group and a fixed or a movable positive lens group which is provided between the second lens group and an imaging device.

However, in the zoom lens system of Japanese Unexamined Patent Publication No. Hei-6-94996, only a small magnification ratio of approximately 2 is achieved, which does not satisfy the requirement for a higher magnification; while the telecentricity as the three-lens-group zoom lens system has been improved.

Furthermore, in the zoom lens system of Japanese Unexamined Patent Publication No. Hei-10-39214, a magnification ratio of approximately 3 is achieved with the same lens arrangement as that of Japanese Unexamined Patent Publication No. Hei-6-94996; however, the number of lens elements is large, and the overall length of the zoom lens system with respect to the focal length is long. Accordingly, the compactness of the camera when the lens barrel is in an accommodation position is sacrificed. Moreover, the zoom lens system of Japanese Unexamined Patent Publication No. Hei-10-39214 cannot be produced at low costs.

Furthermore, in the zoom lens system of Japanese Unexamined Patent Publication No. Hei-11-194274, the first lens group is constituted by two lens elements which include aspherical surfaces, and a small zoom lens system having a zoom ratio of 3 is achieved with 7 lens elements. However, since a plurality of lens elements having aspherical surfaces, which require a higher machining precision, are used, room of improvements still exist in regard to costs.

SUMMARY OF THE INVENTION

The present invention provides a zoom lens system to be used in a small and light-weight video camera or digital camera and the like. The zoom lens system has (i) an aperture ratio of more than 1:2.8 at the short focal length extremity, (ii) a magnification ratio of approximately 3.0, (iii) a half angle-of-view of at least 30° at the short focal length extremity, (iv) an imaging capability adequate enough to cope with a high resolution imaging device, and (v) a simple structure which can be produced at low costs.

As an aspect of the present invention, there is provided a zoom lens system including a negative powered first lens group (hereinafter, the negative first lens group), a positive powered second lens group (hereinafter, the positive second lens group), and a positive powered third lens group (hereinafter, the positive third lens group), in this order from the object.

Upon zooming from the short focal length extremity to the long focal length extremity, the positive third lens group remains stationary, and the negative first lens group and the positive second lens group move along the optical axis of the zoom lens system.

The first lens group includes at least one positive lens element having a convex aspherical surface facing toward the image.

Furthermore, the zoom lens system satisfies the following conditions:

$$1.2 < |f1/f2| < 1.6 \qquad (1)$$

$$0.8 < f3/f2 < 1.3 \qquad (2)$$

wherein
 f1 designates the focal length of the negative first lens group;
 f2 designates the focal length of the positive second lens group; and
 f3 designates the focal length of the positive third lens group.

The negative first lens group includes a negative lens element having a concave surface facing toward the image, and a positive lens element having a convex surface facing toward the image, in this order from the object.

At least the image-side surface of the positive lens element is formed as an aspherical surface. The aspherical surface is formed so that the positive power increases as an increase of a distance from the optical axis, in comparison with the power of the paraxial spherical surface. Furthermore, the zoom lens system satisfies the following condition:

$$0.02 < (\Delta a1 - \Delta a2)/fw < 0.08 \quad (3)$$

wherein $\Delta a1$ designates the amount of asphericity (including a case where $\Delta a1=0$) at the maximum effective radius of the aspherical surface in the case where the aspherical surface is provided on the object-side surface of the positive lens element of the negative first lens group;

$\Delta a2$ designates the amount of asphericity ($\Delta a2 \neq 0$) at the maximum effective radius of the aspherical surface in the case where the aspherical surface is provided on the image-side surface of the positive lens element of the negative first lens group; and fw designates the focal length of the entire zoom lens system at the short focal length extremity.

Note that the amount of asphericity is defined as positive in the direction toward the image from the paraxial spherical surface.

The positive second lens group can include three lens elements, i.e., a biconvex positive lens element, and cemented lens elements having a positive lens element and a negative lens element, in this order from the object. The most image-side surface of the positive second lens group is formed as a strong divergent surface. Furthermore, the zoom lens system satisfies the following condition:

$$0.05 < R2/TL < 0.15 \quad (4)$$

wherein

R2 designates the radius of curvature of the most image-side surface of the positive second lens group; and TL designates the distance along the optical axis from the most object-side surface of the negative first lens group to the most image-side surface of the positive third lens group.

The positive third lens group can include a single biconvex positive lens element, and satisfies the following condition:

$$0.7 < R3/f3 < 1.3 \quad (5)$$

wherein

R3 designates the radius of curvature of the object-side surface of the biconvex positive lens element.

The present disclosure relates to subject matter contained in Japanese Patent Application No. 2001-335437 (filed on Oct. 31, 2001) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C and 2D show aberrations occurred in the lens arrangement shown in FIG. 1, at the short focal length extremity;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIG. 5 is a lens arrangement of a zoom lens system according to a second embodiment of the present invention;

FIGS. 6A, 6B, 6C and 6D show aberrations occurred in the lens arrangement shown in FIG. 5, at the short focal length extremity;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIG. 9 is a lens arrangement of a zoom lens system according to a third embodiment of the present invention;

FIGS. 10A, 10B, 10C and 10D show aberrations occurred in the lens arrangement shown in FIG. 9 at the short focal length extremity;

FIG. 13 is a lens arrangement of a zoom lens system according to a fourth embodiment of the present invention;

FIGS. 14A, 14B, 14C and 14D show aberrations occurred in the lens arrangement shown in FIG. 13 at the short focal length extremity;

DESCRIPTION OF THE PREFERRED EMBODIMENTS

As shown in the lens arrangements of FIGS. 1, 5, 9, 13 and 17, the zoom lens system of the present invention includes a negative first lens group 10, a positive second lens group 20, and a positive third lens group 30, in this order from the object.

Upon zooming from the short focal length extremity to the long focal length extremity, the positive third lens group 30 remains stationary, and the negative first lens group 10 and the positive second lens group 20 move along the optical axis.

Figure 21:
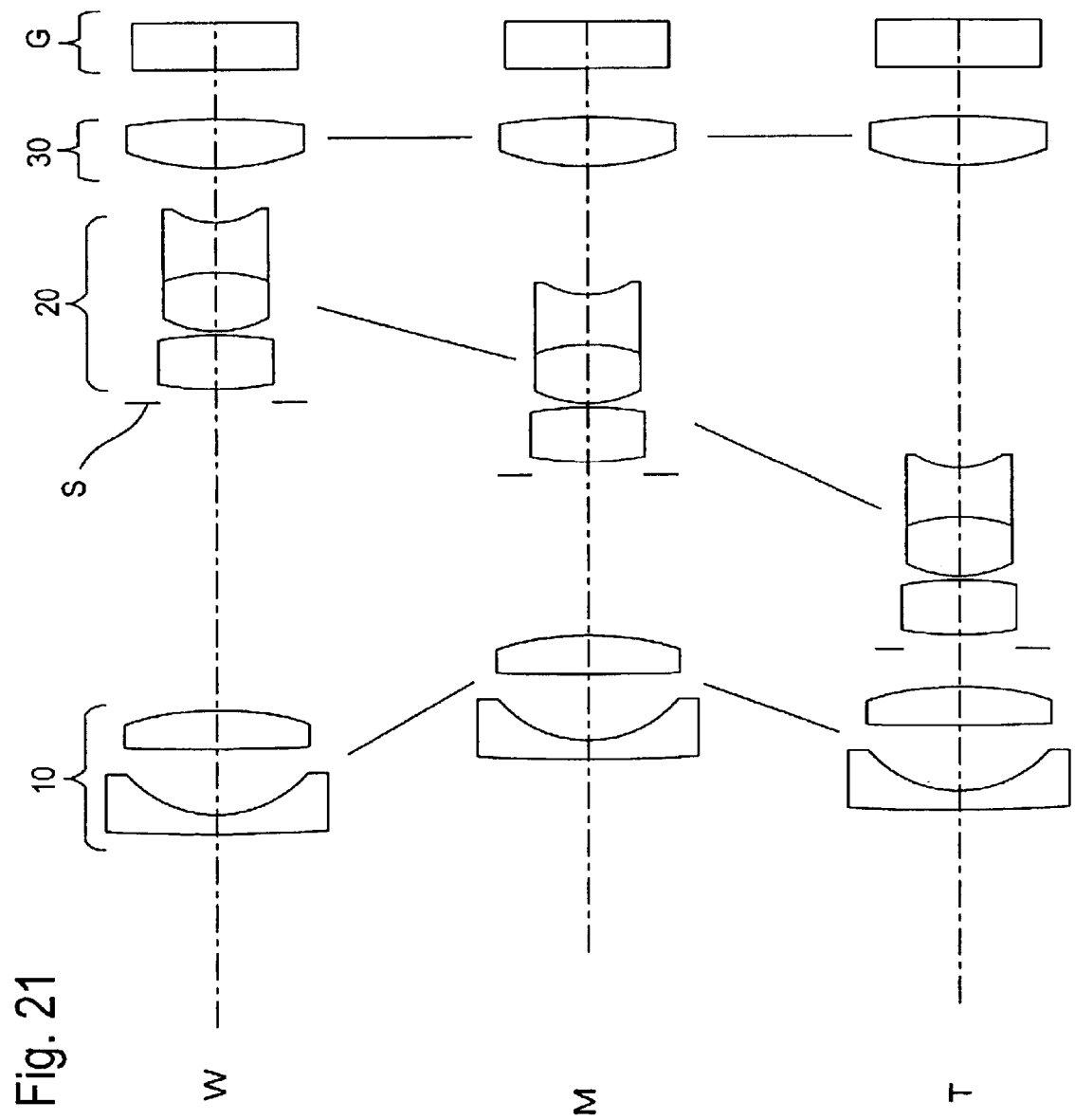
FIG. 21 shows a schematic lens-group moving paths of the zoom lens system according to the present invention.

More specifically, as shown in the schematic lens-group moving paths of FIG. 21, the negative first lens group 10 moves toward the image from the short focal length extremity (wide angle extremity) to an intermediate focal length, and thereafter moves toward the object from the intermediate focal length to the long focal length extremity (telephoto extremity).

The positive second lens group 20 monotonously moves toward the object upon zooming from the short focal length extremity to the long focal length extremity.

A diaphragm S is provided between the negative first lens group 10 and the positive second lens group 20, and moves integrally with the positive second lens group 20 upon zooming.

The negative first lens group 10 includes at least one positive lens element having a convex aspherical surface facing toward the image.

Each lens arrangement of the present invention is applied to a zoom lens system for a digital camera, and G designates a plane-parallel plate representing combination of a low-pass filter, infra-red cut filter, and a CCD cover glass and the like.

Condition (1) specifies the ratio of the power of the negative first lens group 10 to that of the positive second lens group 20. By satisfying this condition, the negative power of the negative first lens group 10 and the positive power of the positive second lens group 20 are appropriately distributed in order to adequately correct the change in aberrations upon zooming, and to achieve further miniaturization.

If the positive power of the positive second lens group 20 becomes too strong to the extent that $|f1/f2|$ exceeds the upper limit of condition (1), it becomes difficult to adequately correct aberrations, including spherical aberration, in a balanced manner, and a sufficient back focal distance in order to provide the filters cannot be secured.

If the positive power of the positive second lens group 20 becomes too weak to the extent that $|f1/f2|$ exceeds the lower limit of condition (1), the zooming function of the positive second lens group 20 upon zooming becomes small, so that the traveling distance of the positive second lens group 20 becomes longer, and the entire the zoom lens system undesirably becomes larger.

In the zoom lens system of the present invention, focusing can be carried out by the negative first lens group 10 or by the positive third lens group 30.

In the case where focusing is carried out by the negative first lens group 10, the focal point advantageously remains stationary upon zooming; however, if an attempt is made to further miniaturize the camera body when the zoom lens system is in an accommodation position, focusing is preferably carried out by the positive third lens group 30, because the lens driving apparatus of the positive third lens group 30 can be miniaturized and simplified, compared with that of the negative first lens group 10.

Condition (2) specifies the ratio of the power of the positive third lens group 30 to that of the positive second lens group 20. By satisfying this condition, suitable telecentricity can be achieved, and the change in aberrations can be reduced when focusing from an object at infinity to an object at a closer distance is performed by the positive third lens group 30.

If the power of the positive third lens group 30 becomes too weak to the extent that f3/f2 exceeds the upper limit of condition (2), telecentricity deteriorates, and the traveling distance of the positive third lens group 30 upon focusing becomes too long. Consequently, it becomes difficult to reduce the change in aberrations particularly at the long focal length side.

If the power of the positive third lens group 30 becomes too strong to the extent that f3/f2 exceeds the lower limit of condition (2), the exit pupil becomes distant from the image plane, so that telecentricity is improved. However, it becomes difficult to adequately correct spherical aberration, and to adjust the flatness of the image plane, while a sufficiently long back focal distance is secured.

The negative first lens group 10 can be constituted by two lens elements, i.e., a negative lens element having a concave surface facing toward the image, and a positive lens element having a convex surface facing toward the image, in this order from the object.

In this arrangement, at least the image-side surface of the positive lens element is formed as an aspherical surface. The aspherical surface is formed so that the positive power increases as an increase of a distance from the optical axis, in comparison with the power of the paraxial spherical surface. Furthermore, the zoom lens system preferably satisfies condition (3).

Furthermore, the diameter of the negative lens element, i.e., the first lens element of the negative first lens group 10, can be reduced by the following arrangement:

a) Forming the most image-side surface of the negative first lens group 10 as a convex shape facing toward the image; and b) Providing an aspherical surface on which the positive power becomes stronger toward the peripheral portion thereof.

In addition to the above, by employing an aspherical surface satisfying condition (3), distortion and astigmatism at the short focal length extremity can be corrected in a balanced manner.

If the amount of asphericity becomes too large to the extent that $(\Delta a1-\Delta a2)/fw$ exceeds the upper limit of condition (3), it becomes difficult to correct coma which occurs at the peripheral portion of the image plane. Moreover, there is a possibility that configuration errors at the peripheral portions of the lens elements may undesirably be accumulated at the time of molding the lens elements, and that strain is undesirably occurred.

If the amount of asphericity becomes too small to the extent that $(\Delta a1-\Delta a2)/fw$ exceeds the lower limit of condition (3), it becomes difficult to reduce negative distortion, especially at the short focal length extremity. Moreover, it becomes difficult to maintain field curvature at the peripheral portion of the image plane smaller, and to maintain the astigmatic difference smaller.

The positive second lens group 20 can be constituted by three lens elements, i.e., a biconvex positive lens element, a biconvex positive lens element, and a biconcave negative lens element, in this order from the object. Since the positive second lens group 20 is a zooming lens group, each lens element has a strong power. Furthermore, it is preferable that the second and third lens elements be formed as cemented lens elements which can be assembled without optical-performance deterioration due to machining errors.

The most image-side surface of the positive second lens group 20 is preferably formed as a strong divergent surface which satisfies condition (4). By forming the final surface of the positive second lens group 20 as a divergent surface, a bundle of light rays emitted from the positive second lens group 20 can be distant from the optical axis without increasing the distance between the positive second lens group 20 and the positive third lens group 30. Accordingly, suitable telecentricity can be achieved by efficiently refracting a bundle of light rays by the positive third lens group 30, and further miniaturization of the entire zoom lens system can be achieved.

If the radius of curvature of the most image-side (final) surface of the positive second lens group 20 becomes larger, thereby, the divergent power becomes too weak to the extent that R2/TL exceeds the upper limit of condition (4), the distance between the positive second lens group 20 and the positive third lens group 30 needs to be increased to achieve suitable telecentricity, which is undesirable in light of further miniaturization of the entire zoom lens system.

If the radius of curvature of the most image-side (final) surface of the positive second lens group 20 becomes smaller, thereby, the divergent power becomes too strong to the extent that R2/TL exceeds the lower limit of condition (4), the positive power of the positive third lens group 30 also becomes too strong at the same time, so that the correcting of spherical aberration and coma becomes difficult.

The positive third lens group 30 can be constituted by a single biconvex positive lens element.

Condition (5) specifies the shape of the positive lens element which constitutes the positive third lens group 30. By satisfying this condition, suitable telecentricity can be achieved, and the optical performance especially at the long focal length extremity can be corrected appropriately.

If the radius of curvature of the object-side surface of the positive lens element becomes too large to the extent that R3/f3 exceeds the upper limit of condition (5), it becomes difficult to reduce the amount of spherical aberration especially at the long focal length extremity, and aberration fluctuations increase upon focusing with the positive third lens group 30 to an object at a closer distance.

If the radius of curvature of the object-side surface of the positive lens element becomes too small to the extent that R3/f3 exceeds the lower limit of condition (5), field curvature excessively occurs at the long focal length extremity.

Furthermore, in the negative first lens group 10, the positive lens element on which an aspherical surface is formed can be made at low cost by using a resin material. However, a resin material is easily influenced by environmental changes such as temperature and humidity, which can be a cause of focal-point deviation. Accordingly, the positive lens element of the negative first lens group 10 preferably satisfies the following condition:

$$3.0 < fp/fw < 7.0 \quad (6)$$

wherein
  fp designates the focal length of the positive lens element of the negative first lens group 10.

If the power of the positive lens element becomes too weak to the extent that fp/fw exceeds the upper limit of condition (6), it becomes difficult to adequately correct chromatic aberrations especially at the long focal length extremity.

If the power of the positive lens element becomes too strong to the extent that fp/fw exceeds the lower limit of condition (6), focal-point deviation caused by environmental changes, such as temperature and the like, becomes undesirably noticeable.

Specific numerical data of the embodiments will be described hereinafter. In the diagrams of chromatic aberration (on-axis chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO designates the f-number, f designates the focal length of the entire wide-angle lens system, fB designates the back focal distance, w designates the half angle-of-view (°), r designates the radius of curvature, d designates the lens-element thickness or distance between lens elements, $N_d$ designates the refractive index of the d-line, and $v_d$ designates the Abbe number.

In addition to the above, an aspherical surface which is symmetrical with respect to the optical axis is defined as follows:

$$x = cy^2/(1 + [1-\{1+K\}c^2y^2]^{1/2}) + A4y^4 + A6y^6 + A8y^8 + A10y^{10}$$

wherein:
  c designates a curvature of the aspherical vertex (1/r);
  y designates a distance from the optical axis;
  K designates the conic coefficient; and
  A4 designates a fourth-order aspherical coefficient;
  A6 designates a sixth-order aspherical coefficient;
  A8 designates a eighth-order aspherical coefficient; and
  A10 designates a tenth-order aspherical coefficient.

[Embodiment 1]

FIG. 1 is a lens arrangement of a zoom lens system according to the first embodiment of the present invention. FIGS. 2A through 2D show aberrations occurred in the lens arrangement shown in FIG. 1, at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical values of the first embodiment.

The negative first lens group 10 includes two lens elements, i.e., a negative meniscus lens element having the convex surface facing toward the object, and a biconvex positive lens element, in this order from the object. On each surface of the biconvex positive lens element, an aspherical surface is formed so that the positive power increases as an increase of a distance from the optical axis, in comparison with the power of the paraxial spherical surface.

The positive second lens group 20 includes three lens elements, i.e., a biconvex positive lens element and cemented lens elements having a biconvex positive lens element and a biconcave negative lens element, in this order from the object.

The positive third lens group 30 includes a single biconvex lens element.

A diaphragms is provided 0.70 on the object side from the lens surface No. 5.

TABLE 1

FNo = 1:2.6 – 3.4 – 5.1
f = 5.80 – 9.00 – 16.50 (Zoom Ratio: 2.84)
W = 32.5 – 21.5 – 12.0
fB = 4.08 – 4.08 – 4.08

| Surface No. | r | d | $N_d$ | $v_d$ |
|---|---|---|---|---|
| 1 | 101.086 | 1.00 | 1.69680 | 55.5 |
| 2 | 6.100 | 3.43 | — | — |

TABLE 1-continued

| | | | | |
|---|---|---|---|---|
| 3* | 200.000 | 2.00 | 1.58547 | 29.9 |
| 4* | −20.591 | 16.65 − 9.00 − 2.70 | — | — |
| 5 | 16.376 | 2.83 | 1.65160 | 58.5 |
| 6 | −16.376 | 0.20 | — | — |
| 7 | 5.763 | 3.07 | 1.48749 | 70.2 |
| 8 | −8.055 | 2.56 | 1.64769 | 33.8 |
| 9 | 4.000 | 2.80 − 6.66 − 15.69 | — | — |
| 10 | 13.054 | 2.50 | 1.69680 | 55.5 |
| 11 | −29.643 | 2.50 | — | — |
| 12 | ∞ | 2.40 | 1.51633 | 64.1 |
| 13 | ∞ | — | — | — |

Aspherical surface data (the aspherical surface coefficients not indicated are zero (0.00)):

| Surf. No. | K | A4 | A6 | A8 |
|---|---|---|---|---|
| 3 | 0.00 | $-5.53674 \times 10^{-5}$ | $-2.36255 \times 10^{-6}$ | $3.24404 \times 10^{-7}$ |
| 4 | 0.00 | $-3.58435 \times 10^{-4}$ | $7.12456 \times 10^{-7}$ | — |

| Surf. No. | Maximum Effective Radius |
|---|---|
| 3 | 4.49 |
| 4 | 4.50 |

*designates the aspherical surface which is rotationally symmetrical with respect to the optical axis.

[Embodiment 2]

FIG. 5 is a lens arrangement of a zoom lens system according to the second embodiment of the present invention. FIGS. 6A through 6D show aberrations occurred in the lens arrangement shown in FIG. 5, at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical values of the second embodiment.

The lens arrangement of the second embodiment is the same as that of the first embodiment; however, in the second embodiment, the radius of curvature of the most image-side surface of the positive second lens group 20 is made relatively larger, so that the amount of astigmatism is reduced, and optical performance at the periphery of the image plane at the short focal length extremity is improved.

A diaphragm S is provided 2.09 on the object side from the lens surface No. 5.

TABLE 2

FNo = 1:2.7 − 3.4 − 5.1
f = 5.80 − 9.00 − 16.50 (Zoom Ratio: 2.84)
W = 32.6 − 21.7 − 12.1
fB = 4.58 − 4.58 − 4.58

| Surface No. | r | d | $N_d$ | $v_d$ |
|---|---|---|---|---|
| 1 | 117.795 | 1.00 | 1.77250 | 49.6 |
| 2 | 7.000 | 3.23 | — | — |
| 3* | 71.672 | 2.30 | 1.58547 | 29.9 |
| 4* | −22.499 | 20.80 − 11.64 − 4.09 | — | — |
| 5 | 11.535 | 3.51 | 1.69680 | 55.5 |
| 6 | −27.648 | 0.20 | — | — |
| 7 | 7.156 | 3.03 | 1.48749 | 70.2 |
| 8 | −7.156 | 2.23 | 1.64769 | 33.8 |
| 9 | 4.626 | 2.80 − 6.88 − 16.43 | — | — |
| 10 | 12.440 | 2.50 | 1.69680 | 55.5 |
| 11 | −40.971 | 3.00 | — | — |
| 12 | ∞ | 2.40 | 1.51633 | 64.1 |
| 13 | ∞ | — | — | — |

TABLE 2-continued

Aspherical surface data (the aspherical surface coefficients not indicated are zero (0.00)):

| Surf. No. | K | A4 | A6 | A8 |
|---|---|---|---|---|
| 3 | 0.00 | $-7.85936 \times 10^{-5}$ | $-2.97477 \times 10^{-8}$ | $1.76051 \times 10^{-7}$ |
| 4 | 0.00 | $-3.11411 \times 10^{-4}$ | $1.63947 \times 10^{-6}$ | — |

| Surf. No. | Maximum Effective Radius |
|---|---|
| 3 | 5.18 |
| 4 | 5.20 |

*designates the aspherical surface which is rotationally symmetrical with respect to the optical axis.

[Embodiment 3]

FIG. 9 is a lens arrangement of a zoom lens system according to the third embodiment of the present invention. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical values of the third embodiment.

The lens arrangement of the third embodiment is the same as that of the first embodiment except that only on the image-side surface of the biconvex positive lens element of the negative first lens group 10, the aspherical surface is formed so that the positive power increases as an increase of a distance from the optical axis, in comparison with the power of the paraxial spherical surface.

A diaphragm S is provided 0.60 on the object side from the lens surface No. 5.

TABLE 3

FNo = 1:2.7 − 3.6 − 5.0
f = 5.00 − 8.50 − 14.30 (Zoom Ratio: 2.86)
W = 32.3 − 19.5 − 11.9
fB = 3.52 − 3.52 − 3.52

| Surface No. | r | d | $N_d$ | $v_d$ |
|---|---|---|---|---|
| 1 | 116.215 | 0.80 | 1.80400 | 46.6 |
| 2 | 6.434 | 2.15 | — | — |
| 3 | 19.472 | 2.00 | 1.58547 | 29.9 |
| 4* | −41.563 | 17.30 − 8.21 − 2.95 | — | — |
| 5 | 13.940 | 2.32 | 1.72916 | 54.7 |
| 6 | −17.597 | 0.20 | — | — |
| 7 | 4.730 | 2.51 | 1.48749 | 70.2 |
| 8 | −7.890 | 2.01 | 1.65446 | 33.6 |
| 9 | 3.261 | 2.00 − 5.61 − 11.58 | — | — |
| 10 | 11.202 | 2.00 | 1.58913 | 61.2 |
| 11 | −16.561 | 2.20 | — | — |
| 12 | ∞ | 2.00 | 1.51633 | 64.1 |
| 13 | ∞ | — | — | — |

Aspherical surface data (the aspherical surface coefficients not indicated are zero (0.00)):

| Surf. No. | K | A4 | A6 | A8 |
|---|---|---|---|---|
| 4 | 0.00 | $-3.52213 \times 10^{-4}$ | $1.84945 \times 10^{-6}$ | $-2.63058 \times 10^{-7}$ |

| Surf. No. | Maximum Effective Radius |
|---|---|
| 4 | 5.05 |

*designates the aspherical surface which is rotationally symmetrical with respect to the optical axis.

[Embodiment 4]

FIG. 13 is a lens arrangement of a zoom lens system according to the fourth embodiment of the present invention. FIGS. 14A through 14D show aberrations occurred in the lens arrangement shown in FIG. 13 at the short focal length extremity. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical values of the fourth embodiment.

The lens arrangement of the fourth embodiment is the same as that of the first embodiment; however, the positive lens element of the negative first lens group 10 is made to have a refractive index and an Abbe number corresponding to those of a lens material for glass-molding.

Lens elements made of a resin material are inexpensive; however, these resin lens elements easily cause the change in internal refractive index, and the changes due to environment; and it is difficult for such a lens element to maintain molding precision. In other words, optical performance of a resin lens element is easily influenced by the above-mentioned drawbacks. Accordingly, by replacing the resin material with a glass material, it becomes possible to solve these drawbacks.

A diaphragm S is provided 0.60 on the object side from the lens surface No. 5.

TABLE 4

FNo = 1:2.7 – 3.6 – 5.1
f = 5.00 – 8.50 – 14.3 (Zoom Ratio: 2.86)
W = 32.4 – 19.6 – 11.9
fB = 4.12 – 4.12 – 4.12

| Surface No. | r | d | Nd | $\nu_d$ |
|---|---|---|---|---|
| 1 | 554.227 | 0.80 | 1.77250 | 49.6 |
| 2 | 6.253 | 2.17 | — | — |
| 3* | 23.979 | 2.00 | 1.68893 | 31.1 |
| 4* | –42.308 | 17.48 – 8.40 – 3.14 | — | — |
| 5 | 14.200 | 3.77 | 1.69680 | 55.5 |
| 6 | –22.274 | 0.20 | — | — |
| 7 | 5.736 | 2.80 | 1.69680 | 55.5 |
| 8 | –4.941 | 1.48 | 1.74950 | 35.0 |
| 9 | 3.605 | 2.20 – 6.18 –12.77 | — | — |
| 10 | 15.155 | 2.00 | 1.69680 | 55.5 |
| 11 | –20.710 | 2.80 | — | — |
| 12 | ∞ | 2.00 | 1.51633 | 64.1 |
| 13 | ∞ | — | — | — |

Aspherical surface data (the aspherical surface coefficients not indicated are zero (0.00)):

| Surf. No. | K | A4 | A6 | AA8 |
|---|---|---|---|---|
| 3 | 0.00 | $2.41384 \times 10^{-5}$ | $1.39743 \times 10^{-6}$ | $3.22843 \times 10^{-7}$ |
| 4 | 0.00 | $-3.25753 \times 10^{-4}$ | $2.84317 \times 10^{-6}$ | — |

| Surf. No. | Maximum Effective Radius |
|---|---|
| 3 | 4.64 |
| 4 | 4.60 |

*designates the aspherical surface which is rotationally symmetrical with respect to the optical axis.

[Embodiment 5]

Figure 11A:
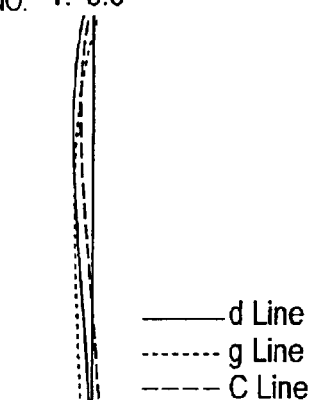
FIGS. 11A, 11B, 11C and 11D show aberrations occurred in the lens arrangement shown in FIG. 9 at an intermediate focal length.
Figure 11B:
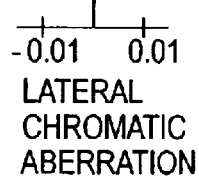
Figure 11C:
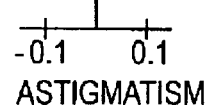
Figure 11D:
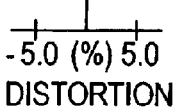
Figure 12A:
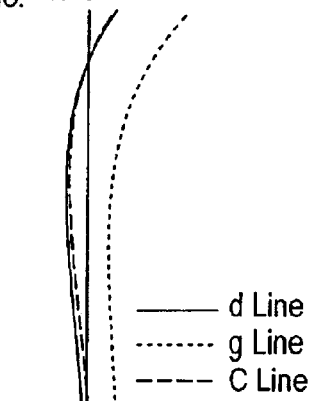
FIGS. 12A, 12B, 12C and 12D show aberrations occurred in the lens arrangement shown in FIG. 9 at the long focal length extremity.
Figure 12B:
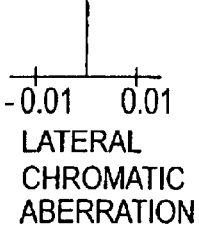
Figure 12C:
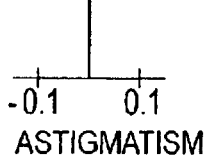
Figure 12D:
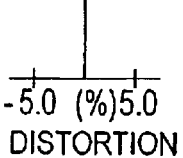
Figure 15A:
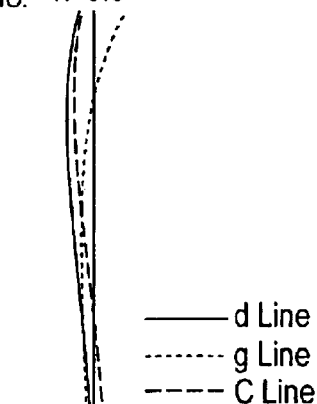
FIGS. 15A, 15B, 15C and 15D show aberrations occurred in the lens arrangement shown in FIG. 13 at an intermediate focal length.
Figure 15B:
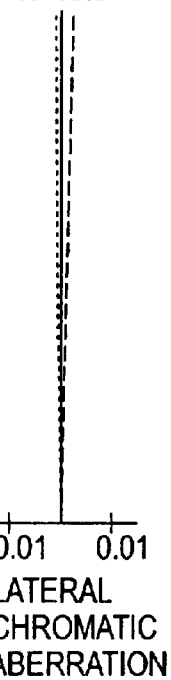
Figure 15C:
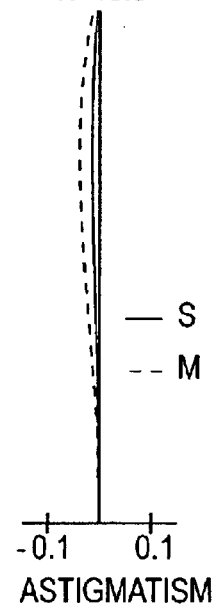
Figure 15D:
Figure 16A:
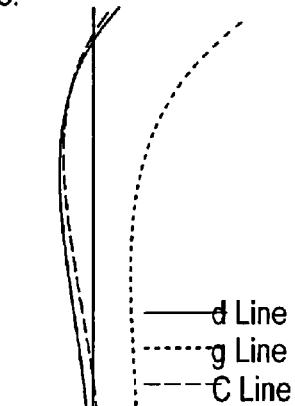
FIGS. 16A, 16B, 16C and 16D show aberrations occurred in the lens arrangement shown in FIG. 13 at the long focal length extremity.
Figure 16B:
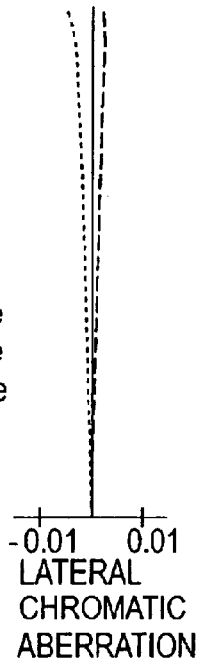
Figure 16C:
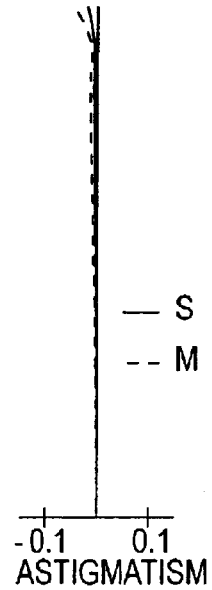
Figure 16D:
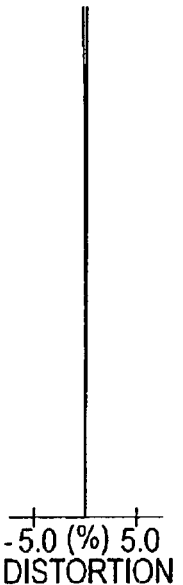
Figure 17:
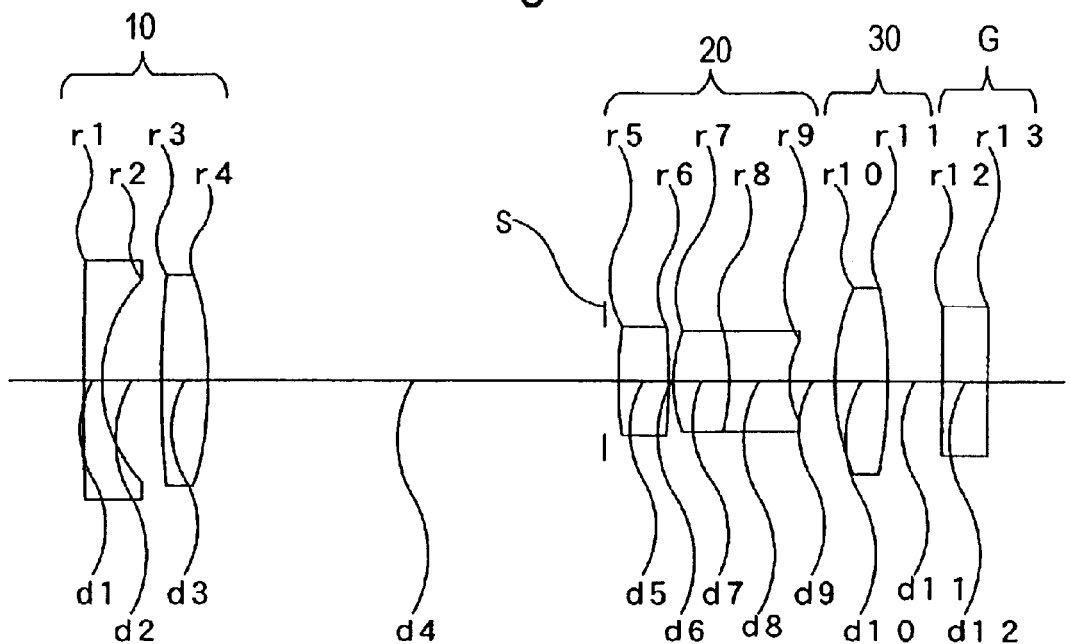
FIG. 17 is a lens arrangement of a zoom lens system according to a fifth embodiment of the present invention.
Figure 18A:
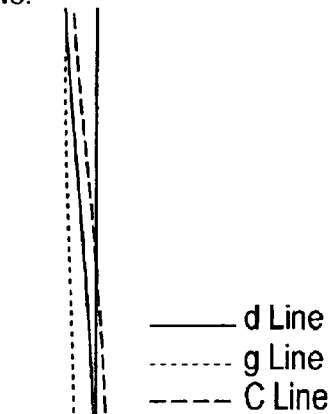
FIGS. 18A, 18B, 18C and 18D show aberrations occurred in the lens arrangement shown in FIG. 17 at the short focal length extremity.
Figure 18B:
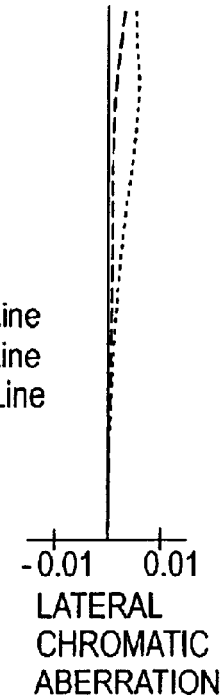
Figure 18C:
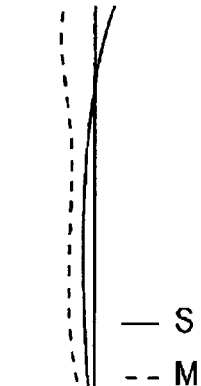
Figure 18D:
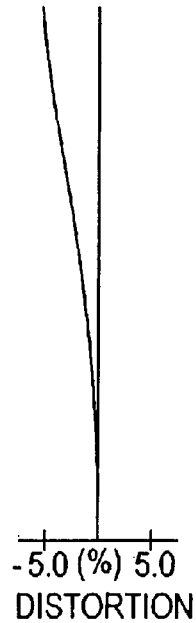
Figure 19A:
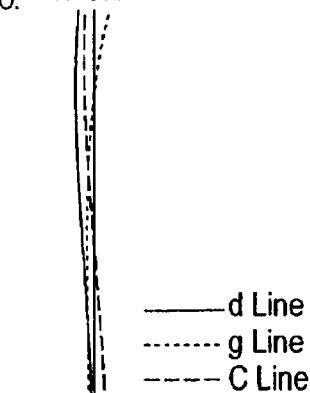
FIGS. 19A, 19B, 19C and 19D show aberrations occurred in the lens arrangement shown in FIG. 17 at an intermediate focal length.
Figure 19B:
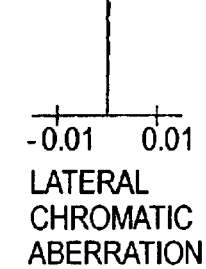
Figure 19C:
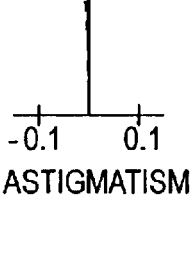
Figure 19D:
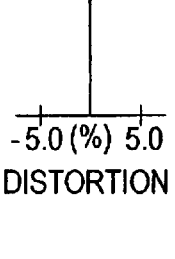
Figure 20A:
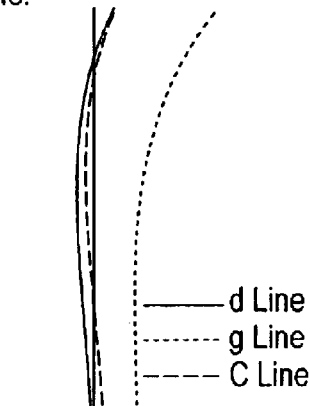
FIGS. 20A, 20B, 20C and 20D show aberrations occurred in the lens arrangement shown in FIG. 17 at the long focal length extremity.
Figure 20B:
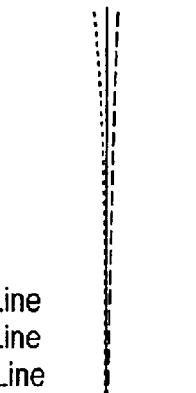
Figure 20C:
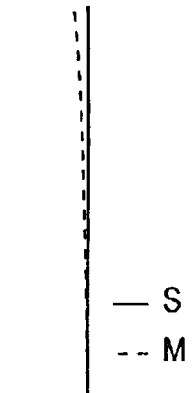
Figure 20D:
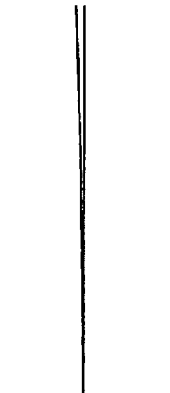

FIG. 17 is a lens arrangement of a zoom lens system according to the fifth embodiment of the present invention. FIGS. 18A through 18D show aberrations occurred in the lens arrangement shown in FIG. 17 at the short focal length extremity. FIGS. 19A through 19D show aberrations occurred in the lens arrangement shown in FIG. 17 at an intermediate focal length. FIGS. 20A through 20D show aberrations occurred in the lens arrangement shown in FIG. 17 at the long focal length extremity. Table 5 shows the numerical values of the fifth embodiment.

The lens arrangement of the fifth embodiment is the same as that of the third embodiment, i.e., only on the image-side surface of the biconvex positive lens element, the aspherical surface is formed so that the positive power increases as an increase of a distance from the optical axis, in comparison with the power of the paraxial spherical surface. Even if the aspherical surface is formed only on one surface, the same optical performance can be achieved as that in the case where the aspherical surface is provided on each surface of the biconvex positive lens element.

A diaphragm S is provided 0.60 on the object side from the lens surface No. 5.

TABLE 5

FNo = 1:2.7 – 3.6 – 5.1
f = 5.00 – 8.50 – 14.30 (Zoom Ratio: 2.86)
W = 32.4 – 19.7 – 11.9
fB = 3.72 – 3.72 – 3.72

| Surface No. | r | d | $N_d$ | $\nu_d$ |
|---|---|---|---|---|
| 1 | 292.695 | 0.80 | 1.80400 | 46.6 |
| 2 | 6.432 | 2.60 | — | — |
| 3 | 46.690 | 2.00 | 1.68893 | 31.1 |
| 4* | –23.098 | 17.85 – 8.45 – 3.00 | — | — |
| 5 | 15.974 | 2.21 | 1.80400 | 46.6 |
| 6 | –25.290 | 0.20 | — | — |
| 7 | 6.185 | 2.43 | 1.70154 | 41.2 |
| 8 | –9.060 | 2.60 | 1.80518 | 25.4 |
| 9 | 3.612 | 2.00 – 6.01 – 12.65 | — | — |
| 10 | 10.694 | 2.30 | 1.64000 | 60.1 |
| 11 | –22.597 | 2.40 | — | — |
| 12 | ∞ | 2.00 | 1.51633 | 64.1 |
| 13 | ∞ | — | — | — |

Aspherical surface data (the aspherical surface coefficients not indicated are zero (0.00)):

| Surf. No. | K | A4 | A6 | A8 |
|---|---|---|---|---|
| 4 | 0.00 | $-3.06948 \times 10^{-4}$ | $1.23092 \times 10^{-6}$ | $-2.26782 \times 10^{-7}$ |

| Surf. No. | Maximum Effective Radius |
|---|---|
| 4 | 4.60 |

*designates the aspherical surface which is rotationally symmetrical with respect to the optical axis.

Each condition of each embodiment is shown in Table 6.

TABLE 6

| | Embod.1 | Embod.2 | Embod.3 | Embod.4 | Embod. 5 |
|---|---|---|---|---|---|
| Condition (1) | 1.349 | 1.332 | 1.530 | 1.407 | 1.463 |
| Condition (2) | 1.087 | 1.012 | 1.093 | 1.149 | 1.019 |
| Condition (3) | 0.026 | 0.040 | 0.062 | 0.043 | 0.034 |
| Condition (4) | 0.108 | 0.113 | 0.098 | 0.103 | 0.103 |
| Condition (5) | 0.980 | 0.891 | 0.961 | 1.179 | 0.917 |
| Condition (6) | 5.516 | 5.089 | 4.585 | 4.498 | 4.539 |

As can be understood from Table 6, each of the embodiments satisfy each of the conditions. Furthermore, as can be understood from the aberration diagrams, the various aberrations can be adequately corrected.

According to the above description, a zoom lens system which is used in a small and light-weight video camera or digital camera and the like can be obtained. The zoom lens system can attain the following:
1) an aperture ratio of at least 1:2.8 at the short focal length extremity;
2) a magnification ratio of approximately 3.0;
3) a half angle-of-view of at least 30° at the short focal length extremity;
4) an imaging capability adequate enough to cope with a high resolution imaging device; and
5) a simple structure which can be produced at low costs.

What is claimed is:

1. A zoom lens system comprising a negative first lens group, a positive second lens group, and a positive third lens group, in this order from an object,
   wherein upon zooming from the short focal length extremity to the long focal length extremity, said positive third lens group remains stationary, and said negative first lens group and said positive second lens group move along the optical axis of said zoom lens system;
   wherein said first lens group comprises at least one positive lens element having a convex aspherical surface facing toward an image; and
   wherein said zoom lens system satisfies the following conditions:

$1.2<|f1/f2|<1.6$ $0.8<f3/f2<1.3$ wherein
   f1 designates the focal length of said negative first lens group;
   f2 designates the focal length of said positive second lens group; and
   f3 designates the focal length of said positive third lens group.

2. The zoom lens system according to claim 1, wherein said negative first lens group comprises a negative lens element having a concave surface facing toward said image, and a positive lens element having a convex surface facing toward said image, in this order from said object,
   wherein at least the image-side surface of said positive lens element comprises an aspherical surface;
   wherein said aspherical surface is formed so that the positive power increases as an increase of a distance from the optical axis, in comparison with the power of a paraxial spherical surface; and
   wherein said zoom lens system satisfies the following condition:

$0.02<(\Delta a1-\Delta a2)/fw<0.08$ wherein
   Δa1 designates the amount of asphericity (including a case where Δa1=0) at the maximum effective radius of said aspherical surface in the case where said aspherical surface is provided on the object-side surface of said positive lens element of said negative first lens group;
   Δa2 designates the amount of asphericity (Δa2≠0) at the maximum effective radius of said aspherical surface in the case where said aspherical surface is provided on the image-side surface of said positive lens element of said negative first lens group; and
   fw designates the focal length of the entire zoom lens system at the short focal length extremity.

3. The zoom lens system according to claim 1, wherein said positive second lens group comprises a biconvex positive lens element, and cemented lens elements comprising a positive lens element and a negative lens element, in this order from said object,
   wherein the most image-side surface of said positive second lens group comprises a strong divergent surface; and
   wherein said zoom lens system satisfies the following condition:

$0.05<R2/TL<0.15$ wherein
   R2 designates the radius of curvature of the most image-side surface of said positive second lens group; and
   TL designates the distance along the optical axis from the most object-side surface of said negative first lens group to the most image-side surface of said positive third lens group.

4. The zoom lens system according to claim 1, wherein said positive third lens group comprises a single biconvex positive lens element, and satisfies the following condition:

$0.7<R3/f3<1.3$ wherein
   R3 designates the radius of curvature of the object-side surface of said biconvex positive lens element.

* * * * *